(12) United States Patent
Siegel

(10) Patent No.: US 7,399,982 B2
(45) Date of Patent: Jul. 15, 2008

(54) UV CURING SYSTEM AND PROCESS WITH INCREASED LIGHT INTENSITY

(75) Inventor: Stephen B. Siegel, Chicago, IL (US)

(73) Assignee: Con-Trol-Cure, Inc, Chicago, IL (US)

(*) Notice: Subject to any disclaimer, the term of this patent is extended or adjusted under 35 U.S.C. 154(b) by 78 days.

(21) Appl. No.: 10/908,651

(22) Filed: May 20, 2005

(65) Prior Publication Data

US 2005/0222295 A1 Oct. 6, 2005

Related U.S. Application Data

(63) Continuation-in-part of application No. 10/907,180, filed on Mar. 23, 2005, and a continuation-in-part of application No. 10/886,332, filed on Jul. 7, 2004, and a continuation-in-part of application No. 10/753,947, filed on Jan. 7, 2004, now Pat. No. 7,211,299, and a continuation-in-part of application No. 10/386,980, filed on Mar. 12, 2003, now abandoned, and a continuation-in-part of application No. 10/339,264, filed on Jan. 9, 2003, now Pat. No. 7,175,712.

(51) Int. Cl.
*C08J 7/04* (2006.01)
*H01L 31/14* (2006.01)

(52) U.S. Cl. ............ 250/553; 250/494.1; 250/504 R; 427/492; 427/493; 427/510; 427/511

(58) Field of Classification Search ............ 522/2, 522/4; 427/492, 508, 493, 510, 511; 250/553, 250/494.1, 504 R
See application file for complete search history.

(56) References Cited

U.S. PATENT DOCUMENTS 3,737,051 A 6/1973 Horino
3,800,160 A 3/1974 Ishizawa et al.
3,819,929 A 6/1974 Newman (Continued)

FOREIGN PATENT DOCUMENTS

GB 2350321 A 11/2000

(Continued)

OTHER PUBLICATIONS

"*Photoinitiators for UV Curing Key Products Selection Guide, Coating Effects*", by Ciba Specialty Chemicals, Edition 2001, Switzerland.

(Continued)

*Primary Examiner*—Susan W. Berman
(74) *Attorney, Agent, or Firm*—Neal, Gerber & Eisenberg LLP

(57) ABSTRACT

A special method is provided for more uniformly and quickly curing products with a scratch-resistant UV curable coating or UV curable printing thereon with high intensity UV light, such as for wires, cables, tubes, tubing, hoses, pipes, CDs, DVDs, golf balls, golf tees, eye glass lenses, contact lenses, string instruments, decorative labels, peelable labels, peelable stamps, doors, countertops, etc. The method can also be operated with one or more special UV curing apparatus equipped with a controller and one or more super high power UV-LED modules.

7 Claims, 13 Drawing Sheets

U.S. PATENT DOCUMENTS

| | | | |
|---|---|---|---|
| 4,010,374 A | 3/1977 | Ramler | |
| 4,145,136 A | 3/1979 | Takahashi | |
| 4,309,452 A | 1/1982 | Sachs | |
| 4,490,410 A | 12/1984 | Takiyama et al. | |
| 4,910,107 A | 3/1990 | Kawada et al. | |
| 4,980,701 A | 12/1990 | Contois et al. | |
| 4,990,971 A | 2/1991 | Le Creff | |
| 5,062,723 A | 11/1991 | Takeda et al. | |
| 5,278,432 A | 1/1994 | Ignatius et al. | |
| 5,278,482 A | 1/1994 | Bahn | |
| 5,420,768 A | 5/1995 | Kennedy | |
| 5,535,673 A | 7/1996 | Bocko et al. | |
| 5,634,711 A | 6/1997 | Kennedy et al. | |
| 5,660,461 A | 8/1997 | Ignatius et al. | |
| 5,731,112 A | 3/1998 | Lewis et al. | |
| 5,762,867 A | 6/1998 | D'Silva | |
| 5,764,263 A | 6/1998 | Lin | |
| 5,840,451 A * | 11/1998 | Moore et al. | 430/30 |
| D404,045 S | 1/1999 | Mandellos | |
| D404,046 S | 1/1999 | Mandellos | |
| D404,409 S | 1/1999 | Mandellos | |
| 5,857,767 A | 1/1999 | Hochstein | |
| 5,963,240 A | 10/1999 | Shinohara et al. | |
| 5,973,331 A * | 10/1999 | Stevens et al. | 250/492.1 |
| 5,986,682 A | 11/1999 | Itou | |
| 5,990,498 A | 11/1999 | Chapnik et al. | |
| 6,013,330 A | 1/2000 | Lutz | |
| 6,075,595 A | 6/2000 | Malinen | |
| 6,092,890 A | 7/2000 | Wen et al. | |
| 6,112,037 A | 8/2000 | Nagata et al. | |
| 6,145,979 A | 11/2000 | Caiger et al. | |
| 6,163,036 A | 12/2000 | Taninaka et al. | |
| 6,185,394 B1 | 2/2001 | Lee | |
| 6,188,086 B1 | 2/2001 | Masuda et al. | |
| 6,200,134 B1 | 3/2001 | Kovac et al. | |
| 6,354,700 B1 | 3/2002 | Roth | |
| 6,425,663 B1 | 7/2002 | Eastlund et al. | |
| 6,447,112 B1 | 9/2002 | Hu et al. | |
| 6,457,823 B1 | 10/2002 | Cleary et al. | |
| 6,498,355 B1 | 12/2002 | Harrah et al. | |
| 6,501,084 B1 * | 12/2002 | Sakai et al. | 250/504 R |
| 6,517,218 B2 | 2/2003 | Hochstein | |
| 6,523,948 B2 | 2/2003 | Matsumoto et al. | |
| 6,525,752 B2 | 2/2003 | Vackier et al. | |
| 6,528,955 B1 | 3/2003 | Powers et al. | |
| 6,536,889 B1 | 3/2003 | Biegelsen et al. | |
| 6,561,640 B1 | 5/2003 | Young | |
| 6,589,716 B1 | 7/2003 | Sweatt et al. | |
| 6,630,286 B2 | 10/2003 | Kramer | |
| 6,671,421 B1 | 12/2003 | Ogata et al. | |
| 6,683,421 B1 | 1/2004 | Kennedy et al. | |
| 6,726,317 B2 | 4/2004 | Codos | |
| 6,755,647 B2 | 6/2004 | Melikechi et al. | |
| 6,783,810 B2 | 8/2004 | Jin et al. | |
| 6,807,906 B1 | 10/2004 | DeMoore et al. | |
| 6,880,954 B2 | 4/2005 | Ollett et al. | |
| 6,885,035 B2 | 4/2005 | Bhat et al. | |
| 6,949,591 B1 | 9/2005 | Allard et al. | |
| 7,080,900 B2 | 7/2006 | Takabayashi et al. | |
| 7,137,696 B2 | 11/2006 | Siegel | |
| 7,153,015 B2 | 12/2006 | Brukilacchio | |
| 7,175,712 B2 | 2/2007 | Siegel | |
| 2001/0030866 A1 | 10/2001 | Hochestein | |
| 2001/0032985 A1 | 10/2001 | Bhat et al. | |
| 2001/0046652 A1 | 11/2001 | Ostler et al. | |
| 2001/0048814 A1 | 12/2001 | Lenmann et al. | |
| 2001/0052920 A1 | 12/2001 | Matsumoto et al. | |
| 2002/0015234 A1 | 2/2002 | Suzuki et al. | |
| 2002/0016378 A1 | 2/2002 | Jin et al. | |
| 2002/0044188 A1 | 4/2002 | Codos | |
| 2002/0074554 A1 | 6/2002 | Sweatt et al. | |
| 2002/0074559 A1 | 6/2002 | Dowling et al. | |
| 2002/0149660 A1 | 10/2002 | Cleary et al. | |
| 2002/0175299 A1 | 11/2002 | Kanie et al. | |
| 2003/0109599 A1 | 6/2003 | Kamen | |
| 2003/0218880 A1 | 11/2003 | Brukilacchio | |
| 2004/0011457 A1 | 1/2004 | Kobayashi et al. | |
| 2004/0090794 A1 | 5/2004 | Ollet et al. | |
| 2004/0114016 A1 | 6/2004 | Yokoyama | |
| 2004/0134603 A1 | 7/2004 | Kobayashi et al. | |
| 2004/0135159 A1 | 7/2004 | Siegel | |
| 2004/0152023 A1 | 8/2004 | Kumagai | |
| 2004/0156130 A1 | 8/2004 | Powell et al. | |
| 2004/0164325 A1 | 8/2004 | Siegel | |
| 2004/0166249 A1 | 8/2004 | Siegel | |
| 2004/0189773 A1 | 9/2004 | Masumi | |
| 2004/0238111 A1 | 12/2004 | Siegel | |
| 2005/0099478 A1 | 5/2005 | Iwase | |
| 2005/0104946 A1 | 5/2005 | Siegel | |
| 2005/0152146 A1 | 7/2005 | Owen et al. | |
| 2005/0222295 A1 | 10/2005 | Siegel | |
| 2006/0007290 A1 | 1/2006 | Oshima et al. | |
| 2006/0127594 A1 | 6/2006 | Siegel | |
| 2006/0192829 A1 | 8/2006 | Mills et al. | |
| 2006/0204670 A1 | 9/2006 | Siegel | |
| 2006/0230969 A1 | 10/2006 | Vosahlo | |
| 2006/0233501 A1 | 10/2006 | Sampson | |
| 2006/0237658 A1 | 10/2006 | Waluszko | |
| 2006/0245187 A1 | 11/2006 | Scott et al. | |

FOREIGN PATENT DOCUMENTS

| | | |
|---|---|---|
| GB | 2390332 A | 1/2004 |
| GB | 2396331 A | 6/2004 |
| JP | 1-124324 | 5/1989 |
| JP | 5-323462 | 12/1993 |
| JP | 11-277795 | 10/1999 |
| JP | 2000-268416 B | 9/2000 |
| JP | 2001-209980 B | 8/2001 |
| JP | 2002-248803 | 9/2002 |
| JP | 2005-129662 B | 5/2005 |
| WO | WO 2004/002746 A1 | 1/2004 |
| WO | WO 2004/011848 A2 | 2/2004 |

OTHER PUBLICATIONS

"*Photoinitiators for UV Curing Formulators' Guide for Coatings, Additives*", by Ciba Specialty Chemicals, Edition 2001, Switzerland.

"*Optical Properties of Si-Doped $Al_xGa_{1-x}N/Al_yGa_{1-y}N$ ($x=0.24$-$0.53$, $y=0.11$) Multi-Quantum-Well Structures*" by H. Hirayama and Y. Aoyagi, The Institute of Physical and Chemical Research, Saitama, Japan, MRS Internet J. Nitride Semicond. Res. 4S1,G3.74 (1999).

Pappas, Peter, ed., UV Curing: Science And Technology, "Light Sources" (by Vincent McGinniss), Technology Marketing Corp., Stamford, Connecticut, USA, 1978 (no month), excerpts page 96-101.

PCT International Search Report, mailed on Apr. 20, 2005 for International Application No. PCT/US04/38069, International Filing Date Nov. 16, 2004 for Applicant, Con-Trol-Cure, Inc.

PCT International Search Report, mailed on Apr. 6, 2006 for International Application No. PCT/US05/33619, International Filing Date Sep. 20, 2005 for Applicant, Con-Trol-Cure, Inc.

PCT International Search Report, mailed on Feb. 11, 2005 for International Application No. PCT/US04/21655, International Filing Date Jul. 7, 2004 for Applicant, Con-Trol-Cure, Inc.

PCT International Search Report, mailed on Jun. 28, 2007 for International Application No. PCT/US07/061116, International Filing Date Jan. 26, 2007 for Applicant, Con-Trol-Cure, Inc.

PCT International Search Report, mailed on Oct. 14, 2005 for International Application No. PCT/US04/01594, International Filing Date Jan. 23, 2004 for Applicant, Con-Trol-Cure, Inc.

PCT International Search Report, mailed on Sep. 14, 2006 for international Application No. PCT/US05/34726, International Filing Date Sep. 27, 2005 for Applicant, Con-Trol-Cure, Inc.

PCT International Search Report and Written Opinion of International Searching Authority, mailed on Oct. 13, 2004 for International Application No. PCT/US04/01495, International Filing Date Jan. 21, 2004 for Applicant, Con-Trol-Cure, Inc.

PCT International Search Report, mailed on Apr. 20, 2005 for International Application No. PCT/US04/38068, International Filing Date Nov. 16, 2004 for Applicant, Con-Trol-Cure, Inc.

PCT International Search Report and Written Opinion of International Searching Authority, mailed on Feb. 11, 2005 for International Application No. PCT/US04/20935, International Filing Date Jun. 29, 2004 for Applicant, Con-Trol-Cure, Inc.

Webster's Ninth New Collegiate Dictionary, Merriam-Webster Inc., Springfiled, Mass., USA, 1990 (no month), excerpt p. 199 & 394.

Written Option from Australian Patent Office dated Aug. 28, 2007 for related Singapore Patent Application 2006045140.

Written Option from Australian Patent Office dated Sep. 10, 2007 for related Singapore Patent Application No. SG2006045140-0.

Written Option dated Sep. 10, 2007 for related Singapore Patent Application No. 200604514.

Korean Office Action dated Sep. 10, 2007 for related Korean Patent Application No. 10-2006-7015718.

Office Action dated Feb. 1, 2008 for related Chinese Patent Application 2004800400114.3.

* cited by examiner

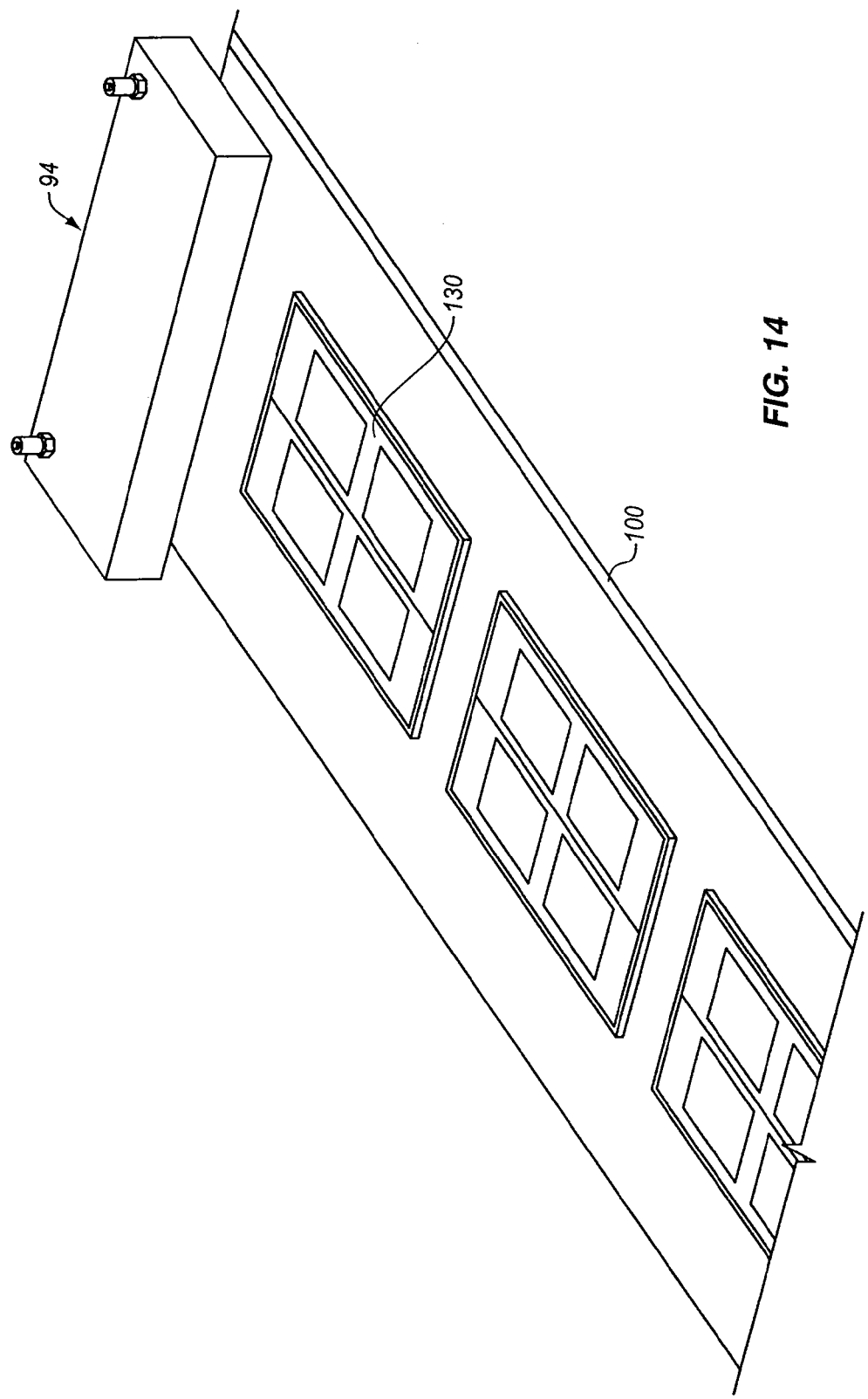

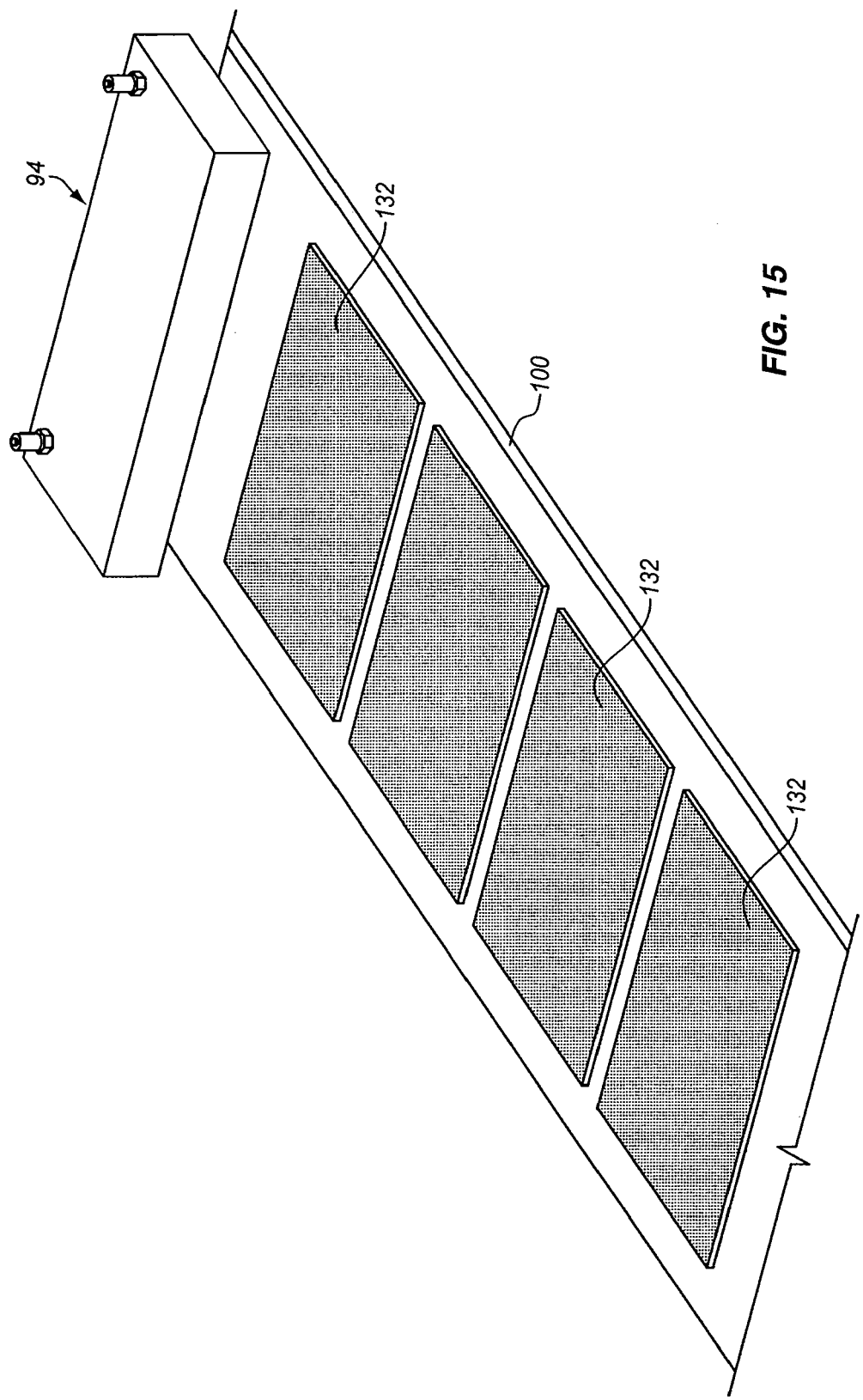

UV CURING SYSTEM AND PROCESS WITH INCREASED LIGHT INTENSITY

CROSS REFERENCE TO RELATED APPLICATIONS

This application is a continuation-in-part of U.S. application Ser. No. 10/907,180 filed Mar. 23, 2005 for "UV Printing and Curing of CD's, DVD's Golf Balls and Other Products" which is a continuation-in-part of U.S. application Ser. No. 10/886,332, filed Jul. 7, 2004 for a "UV LED Control Loop and Controller for UV Curing" which is a continuation-in-part of U.S. application Ser. No. 10/753,947, filed Jan. 7, 2004, for a "UV Curing Method and Apparatus" now U.S. Pat. No. 7,211,299 which is a continuation-in-part of U.S. application Ser. No. 10/386,980 filed Mar. 12, 2003, for "Multiple Wavelength UV Curing" now abandoned which is a continuation-in-part of U.S. application Ser. No. 10/339,264 filed Jan. 9, 2003, for "A Light Emitting Apparatus and Method for Curing Inks, Coatings and Adhesives" now U.S. Pat. No. 7,175,712.

BACKGROUND OF THE INVENTION

1. Field of the Invention

The present invention relates to a method for ultraviolet (UV) curing of inks, coatings and adhesives having UV photo initiators therein which, when exposed to UV light, convert monomers in the inks, coatings and adhesives to linking polymers to solidify the monomer material and which are placed on a variety of products using one or more super high power ultraviolet light-emitting diode (UV-LED) modules. More specifically, the present invention relates to a method for UV curing of inks, coatings or adhesives on optical fibers, wires, cables, tubes, tubing, hoses, pipes, compact discs (discs) (CDs), digital video discs (discs) (DVDs), golf balls, golf tees, string instruments, eye glass lenses, contact lenses, decorative labels, peelable labels, stamps, doors, countertops, and other products using one or more high power UV-LED modules.

2. Description of the Related Art

Heretofore, UV light-emitting diodes (LEDs) and UV lamps have been proposed for supplying UV light for curing UV curable inks, coatings and adhesives on various products. Many of the prior art techniques are time-consuming and inefficient and can cause uneven curing of the products.

It is, therefore, desirable to provide an improved UV curing method and apparatus which overcomes most, if not all, of the preceding problems.

BRIEF SUMMARY OF THE INVENTION

An improved ultraviolet (UV) curing method and apparatus are provided which quickly, efficiently and effectively cures UV curable products, articles, inks, coatings, adhesives, and other objects. Advantageously, the user-friendly UV curing method and apparatus are economical, dependable and easy-to-use.

In the novel method and apparatus, substantially uniform continuous or intermittent blasts or pulses of high intensity UV light are emitted from UV light emitters in one or more UV curing apparatus at a substantially constant output level and intensity along one or more UV light paths. The UV light emitters are super high power UV-LED modules with high intensity UV-LED chips. Significantly, the high intensity UV-LED chips are prevented from being positioned opposite each other and in the path of the high intensity UV light so that the high intensity UV light does not contact and degrade the high intensity UV-LED chips. The UV curable products, articles, inks, coatings, adhesives, and other objects can be intermittently, sequentially or continuously positioned in the UV light path. Desirably, the UV light is substantially uniformly applied and distributed on the UV curable products, articles, inks, coatings, adhesives, and other products in the UV light path. Advantageously, thereafter, the UV curable products, articles, inks, coatings, adhesives, and other objects are partially or fully substantially uniformly and evenly polymerized, set and cured in the UV-light path with the intermittent blasts or pulses of UV light.

In the preferred method and apparatus, the temperature of the UV light emitters, UV curing apparatus, or UV light is controlled with one or more high power, water cooled UV-LED modules through which distilled water is pumped. The high power UV-LED module can be the module manufactured and sold by NICHIA Corporation of Tokushima Japan under model no. NLBU21WO1-E1.

The UV curable products, articles, inks, coatings, adhesives, and other objects can be conveyed by a conveyor in the light path. The UV curable products, articles, inks, coatings, adhesives, and other objects can also be spun or rotated in the light path to enhance uniform distribution and application of UV light and curing on the UV curable products, articles, inks, coatings, adhesives, and other objects. In some circumstances, such as for some types of UV printing, it may be desirable to position, stop, or maintain the UV curable products, articles, inks, coatings, adhesives, and other objects in a stationary fixed location and position on the UV light path during curing.

The novel UV curing method is particularly useful to cure clear transparent scratch-resistant UV curable coatings and/or printing of names, trademarks, logos, and/or designs of black or colored UV curable ink on various products, such as: optical fibers, wires, cables, tubes, tubings, hoses, pipes, compact discs (CDs) including audio discs and computer discs, digital video discs (DVDs), golf balls, golf tees, eye glass lenses, UV curable soft hydroscopic contact lenses, doors, countertops, guitars and other string instruments, decorative labels, peelable labels and peelable stamps i.e. labels that can be readily peeled, removed, stripped, or detached from an underlying sheet or backing sheet.

As will be described in greater detail hereinafter, the method and apparatus of the present invention further provides techniques and structures for applying high intensity UV light from one or more super high power UV-LED modules to a UV curable product, article, ink, coating, adhesive, or other object to be cured.

According to one of the teachings of the present invention, there is provided a UV curing apparatus, system and method for curing UV curable products, articles, inks, coatings, adhesives, and other objects that have a UV curable material thereon or therein.

A more detailed explanation of the invention is provided in the following description and appended claims taken in conjunction with the accompanying drawings.

BRIEF DESCRIPTION OF THE SEVERAL VIEWS OF THE DRAWINGS

FIG. 14 is a perspective view of a super high power UV-LED module assembly positioned along a portion of a conveyor carrying doors which have been coated with a UV curable coating.

FIG. 15 is a perspective view of a super high power UV-LED module assembly positioned over a portion of a conveyor carrying countertops which have been coated with a UV curable coating.

DETAILED DESCRIPTION OF THE INVENTION

A detailed description of the preferred embodiments and best modes for practicing the invention are described herein.

UV-LED's (ultraviolet light emitting diodes) are being used more and more for curing UV curable inks, coatings and adhesives on a variety of different products. Typically such LED's are 0.346 mm$^2$. Also they typically are powered with three to five volts and a power drain of 30 mili watts.

The power output of LED's is being increased so that higher intensity UV light can be emitted by the LED's. As a result, new arrays of UV LED's require more driving power, emit more light and generate more heat. Furthermore, new super high power UV-LED modules are considerably more expensive than the earlier modules with smaller, less inexpensive lower power UV-LED chips that emit low intensity UV light. With small, inexpensive lower power UV-LED chips it is practical to use hundreds or even thousands, e.g., 10,000, chips to create an array of low power UV-LED's to illuminate a product for curing.

New high power UV-LED chips that emit high intensity UV light are being driven with 1 amp rather than 30 milliamps. This is an enormous increase in current and power, but a considerable amount of heat is generated. Methods of applying UV light to a UV curable polymer can now be accomplished with smaller arrays of high power UV-LED chips to evenly expose the UV curable products by either moving the LED array or moving the UV curable products.

Figure 1:
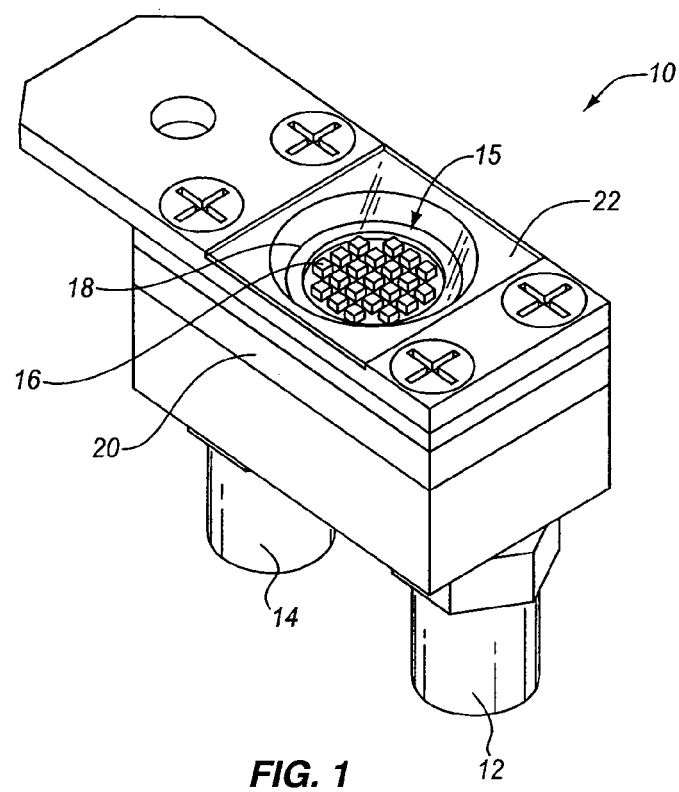
FIG. 1. is a perspective view of a super high power UV-LED module that emits high intensity UV light.

In FIG. 1 there is illustrated a super high power 21 chip UV-LED module 10 of the type manufactured and sold by NICHIA Corporation of Tokushima Japan under model no. NLBU21WO1-E1. The method and apparatus of the present invention make advantageous use of this UV-LED module 10. The module 10 uses 5 watts of power with a sharp operating spectrum of 365 nm, an operating voltage of approximately 6 volts and an operating current of 21 amps.

As shown, the module 10 has water inlets and outlets 12 and 14 to enable cooling water to be circulated beneath an array 15 of twenty one (21) UV-LED chips (UV LED's) 16 which are mounted in a recess 18 in a body 20 of the module 10 and covered with a quartz protector plate 22. The water pressure is approximately 250 kPa and is circulated through the module 10 at an average temperature of 25 degrees centigrade in order to dissipate the heat from the LED's 16 on the module 10.

Figure 2:
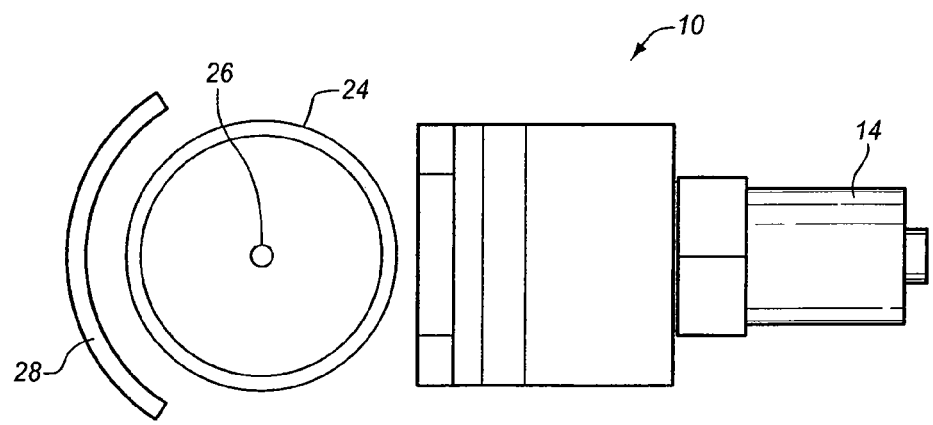
FIG. 2. is an end view of the super high power UV-LED module positioned adjacent a quartz tube having an optical fiber therein with an aluminum reflector positioned on the other side of the quartz tube.

Referring now to FIG. 2, the super high power UV-LED module 10 is shown positioned adjacent to a transparent, quartz tube 24 in the center of which is arranged an optical fiber 26 (or wire, tubing, tube, hose or pipe). The optical fiber 26 can be pulled through the quartz tube 24 from top to bottom or from bottom to top of the quartz tube 24 and the quartz tube 24 can be arranged vertically. An aluminum, curved reflector 28 is positioned opposite the array 15 (FIG. 1) of UV LED's 16 in the module 10 to reflect light back against the optical fiber 26 (FIG. 2). According to the teachings of the present invention, the array 15 (FIG. 1) of UV-LED's 16 is positioned so as not to direct UV light against other UV-LED's 16, since the high intensity UV light can damage the UV-LED chips 16. Additionally, it is to be understood that the optical fiber 26 (FIG. 2) can be rotated as it is moved through the quartz tube 24. Further, it will be understood that the optical fiber 26 (or wire, tubing, tube, hose or pipe) is coated with a UV curable coating or has an UV curable ink thereon.

Figure 3:
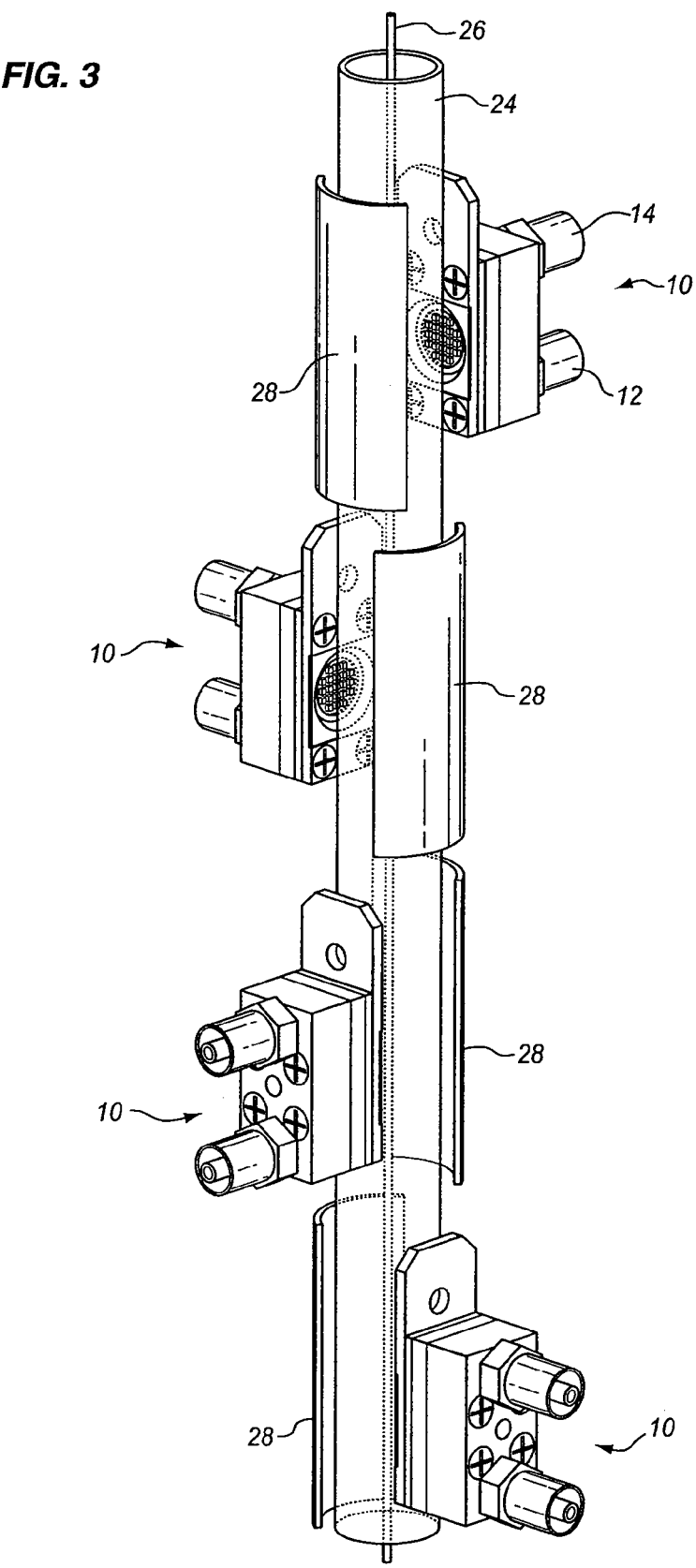
FIG. 3. is a perspective view of 4 super high power modules and 4 reflectors positioned about a quartz tube in a staggered array, each module being 90 degrees from the adjacent module.

In the embodiment shown in FIG. 3, four (4) modules 10 are positioned about the quartz tube 24, which is arranged vertically with the optical fiber 26 (or wire, tubing, tube, hose or pipe) positioned generally centrally within the quartz tube 24. The super high power UV-LED modules 10 are positioned opposite the reflectors and are staggered around the quartz tube 24 such that each adjacent module 10 is rotated 90 degrees from the adjacent module 10 as shown in FIG. 3.

Preferably the interior of the quartz tube 24 is filled with an inert gas, such as nitrogen, to keep the optical fiber 26 (wire, tubing, tube, hose or pipe) oxygen free to facilitate curing of the UV curable material coating or ink on the optical fiber 26 (or wire, tubing, tube, hose or pipe).

At the exit end of the quartz tube 24, the optical fiber 26 is pulled through a valve, similar to a hemostasis valve so that the nitrogen can be kept in the quartz tube 24. If the inert gas is heavier than air, the inert gas can be injected into the top of the glass of the quartz tube 24 and the valve can be located at the lower end of the quartz tube 24 such that the optical fiber is pulled through the quartz tube 24 from top to bottom.

On the other hand, if the inert gas used is lighter than air, the optical fiber 26 (wire, tubing tube, hose or pipe) can be pulled from bottom to top and the valve can be located at the top of the quartz tube 24. If the inert gas is heavier than air, the inert gas can be injected into the bottom end of the quartz tube 24. Alternatively, the inert gas can be circulated through the curing area of the quartz tube 24.

Figure 4:
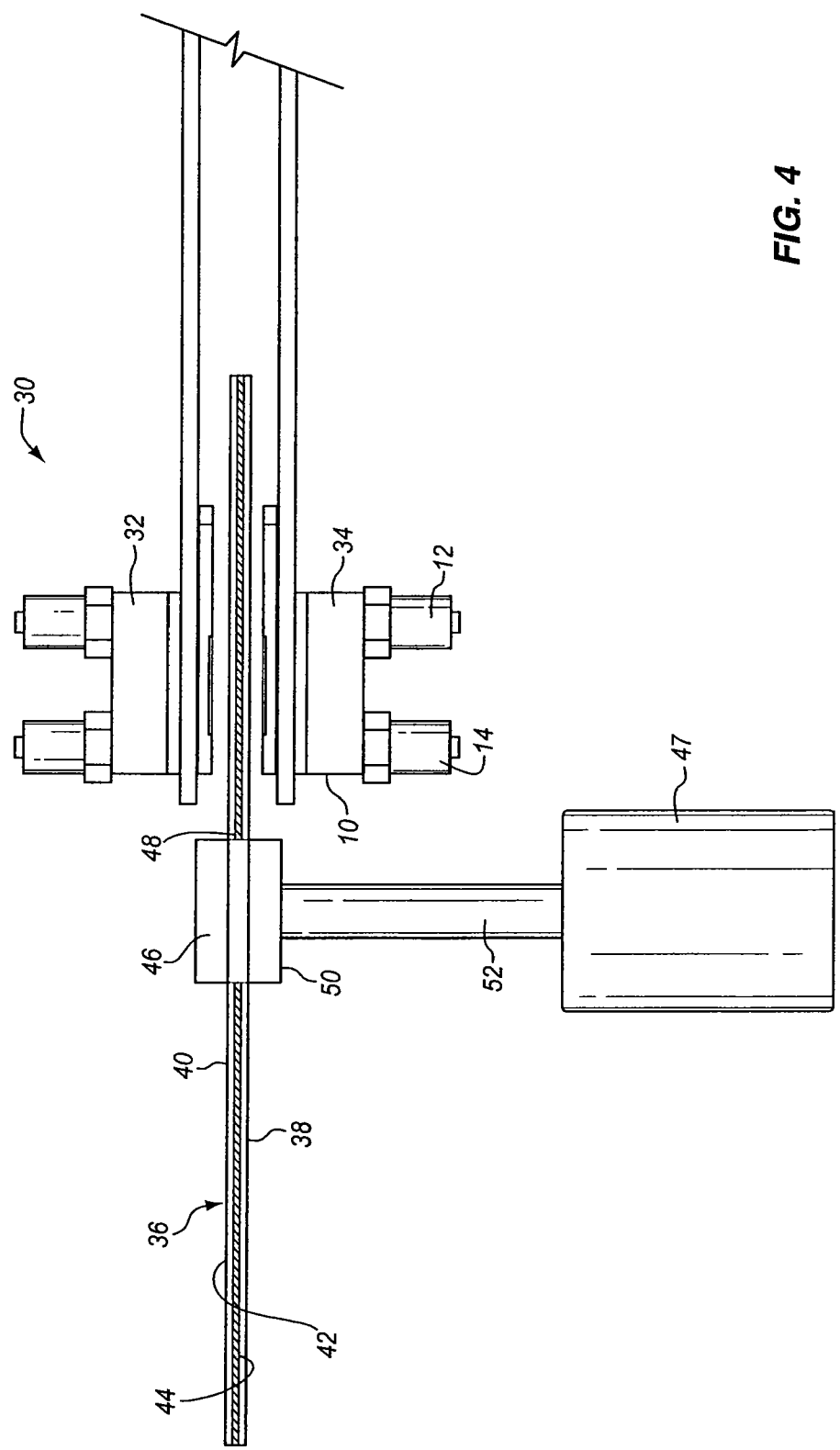
FIG. 4 is a front elevational sectional view of a mandrel mounting two discs which are glued or bonded together to form a DVD and illustrates upper and lower UV-LED modules positioned for radial movement relative to the discs for curing adhesive between the discs as the discs are rotated.

In FIG. 4, a UV curing system 30 uses two super high power UV-LED modules 10, namely an upper module 32 and a lower module 34 for curing a CD or DVD 36. The DVD can comprise a lower first transparent plastic disc 38 having an upper, aluminum, data carrying layer 40 and an upper second transparent plastic disc 42 having a lower aluminum data carrying layer 44. In the construction of the DVD 36, the lower disc 38 can be fixed on a mandrel 46 driven by a motor 47 and a ring of UV curable adhesive 48 can be placed on the aluminum data carrying layer 40 adjacent a hub 50 of the mandrel 46. Then the upper disc 42 can be placed over the lower disc 38 with the aluminum data carrying layer 44 of the upper disc 42 facing the aluminum data carrying layer 40 of the lower disc and facing the ring of adhesive 48. The mandrel 46 can be driven by a motor 52 connected thereto to cause the mandrel 46 to rotate the discs 38 and 42 which causes the UV curable adhesive 48 to flow radially outwardly under centrifugal force. This causes the upper disc 42 to move or press downwardly toward the lower disc 38 as a thin layer of the adhesive 48 is established between the upper and lower discs 38 and 42 by the centrifugal force. While the mandrel 46 is rotating, the upper and lower UV-LED modules 32 and 34 are caused to move inwardly and outwardly, relative to the rotating discs 38 and 42 by a reciprocating mechanism 52 (FIG. 5).

Figure 5:
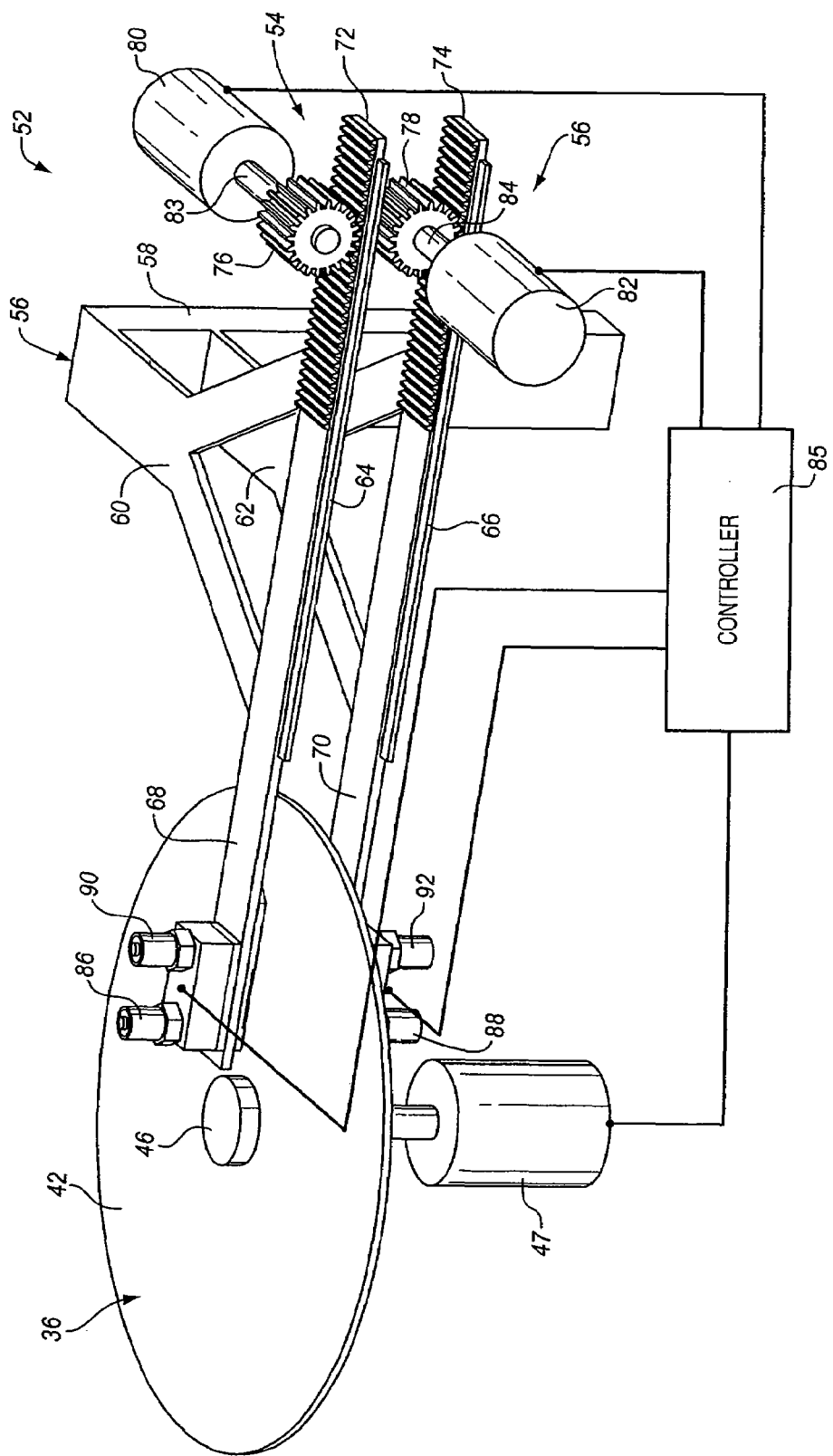
FIG. 5. is a perspective view of the mandrel and DVD shown in FIG. 4 and shows a mechanism for moving the super high power modules radially inwardly and outwardly relative to the DVD on the mandrel.

As shown in FIG. 5, the reciprocating mechanism 52 for moving the UV LED modules 32 and 34 comprises a two rack and pinion mechanisms 54 and 56 mounted on a support structure 56. The support structure 56 includes an upright post 58 from which extends spaced apart upper and lower Y-shaped arms 60 and 62. Each arm 60 and 62 mounts a horizontally disposed track 64 or 66. Each track 64 or 66 slidably supports a rail 68 or 70 including a rack 72 or 74 of one of the rack and pinion mechanisms 54 and 56. Each rack and pinion mechanism 54, 56 also includes a pinion 76 or 78 that engages the rack 72 or 74 on one of the rails 68 or 70. The pinions 76 and 78 are driven, respectively, by motors 80 or 82 via shafts 83 and 84 that are suitably supported adjacent the racks 72 and 74.

A controller 85 (FIG. 5) is eclectically coupled to the motors 47, 80 and 82, as well as to the UV-LED arrays in each of the super high power UV-LED modules 32 and 34. Activation and de-activation (turning on and turning off) of the super high power UV-LED modules, as well as controlling the speed of rotation of the motor 47, and turning on and off of the motors 80 and 82 are controlled by the controller 85. This radial movement of the modules 32 and 34 is synchronized with the rotation of the motor 47 driving the mandrel 46 to ensure complete curing of the UV curable adhesive 48 between the discs 38 and 42.

It is to be understood that as much as 80% of the high intensity UV light from the high power UV-LED arrays may be blocked by the aluminum data carrying layer 40 or 44 (FIG. 4) of the DVD. However the 20% of the high intensity UV light that gets through to the aluminum data carrying layer 40 or 44 is sufficient to cure the adhesive 48, As with the UV LED modules 10 shown in FIG. 3, each of the UV LED modules 32 and 34 has a cooling water input 86 or 88 (FIG. 5) and a cooling water output 90 or 92 which are connected to hoses (not shown) that are carried on the rails 68 and 70 to the support structure 56, and from there to water inlets and outlets and to a source of pressurized water.

In operation, after the upper disc 42 (FIG. 4) and lower disc 38 are positioned on the mandrel 46, the motor 47 is turned on as well as the motors 80 and 82 (FIG. 5) and power to the UV-LED modules 32 and 34 is turned on as well as a water pumping system (not shown) for supplying pressurized cooling water to the UV-LED modules 32 and 34. While the mandrel is rotated, the UV LED modules 32 and 34 are caused to move radially outwardly from the center of the mandrel 46 while a high intensity UV light in the spectrum of 365 nm is directed toward the discs 38 and 42.

As mentioned above, about eighty percent (80%) of the high intensity UV light can be absorbed by the aluminum data carrying layers of the DVD. However approximately twenty percent (20%) of the high intensity UV light can pass through the aluminum data carrying layer to cure the UV curable adhesive 48 in the DVD. The cured DVD is then ejected from the mandrel and the process is repeated starting with another placement of another lower disc 38 on the mandrel 46.

From the foregoing description it will be understood that the high intensity UV LED module can be used for curing inks, coatings or adhesives on elongated structures such as optical fibers, wires, tubes, tubing, hoses or pipes which are pulled through a quartz tube 24 having an inert gas therein and a hemostasis type valve at one end thereof. Also the super high power UV-LED modules can be used to cure CD's or DVD's as illustrated by the UV curing system shown in FIGS. 4 and 5. The super high power UV-LED modules or an assembly thereof or a modification thereof also can be used in UV curing systems of the type for curing eye glass lens, contact lens, golf balls, golf tees, necks for string instruments, labels, peelable labels, doors and countertops. In such curing systems arrays of high power UV LED's are mounted on a cooling module in staggered or overlapping arrays and over or adjacent a conveyer while the object or product having a UV curable ink coating or adhesive thereon passes under or adjacent the high power UV LED assembly.

The opposing arrays are arranged so they are not opposite and facing each other as the high intensity UV light can degrade the high intensity UV-LED chips. An optical fiber can be exposed to several, e.g. 4 arrays, which are alternatively positioned so each array irradiates a portion of the optical fiber, as the optical fiber moves past the high power UV-LED array. Advantageously, the UV-LED's focus is directed onto a reflector with the optical fiber (wire) located between the array and the reflector.

Rather than creating an array in the area of a 5 inch circle for a CD/DVD, it is more desirable to spin the CD/DVD and to transverse a UV-LED array across the spinning disc as in the embodiment described above. The same application for "hard coats" can be used for curing coated eyeglasses. These coating are very thin and use photoinitiators which are designed not to yellow. This requires using lower wavelengths in the 365 nm region. Here too, the UV-LED array can be moved across the eye glass lens rather than to create an array that is the size of the eyeglasses.

An ink jet application can be provided with a high power UV-LED array to cure UV curable ink at a different rate than the printing. Also, a plurality of high power UV-LED arrays can be positioned to create an even more uniform distribution of high intensity UV light. The distribution of the UV light can be based on distance. The relationship of one UV-LED array to the next can directly related to the intensity profile curve of the UV light.

Figure 6:
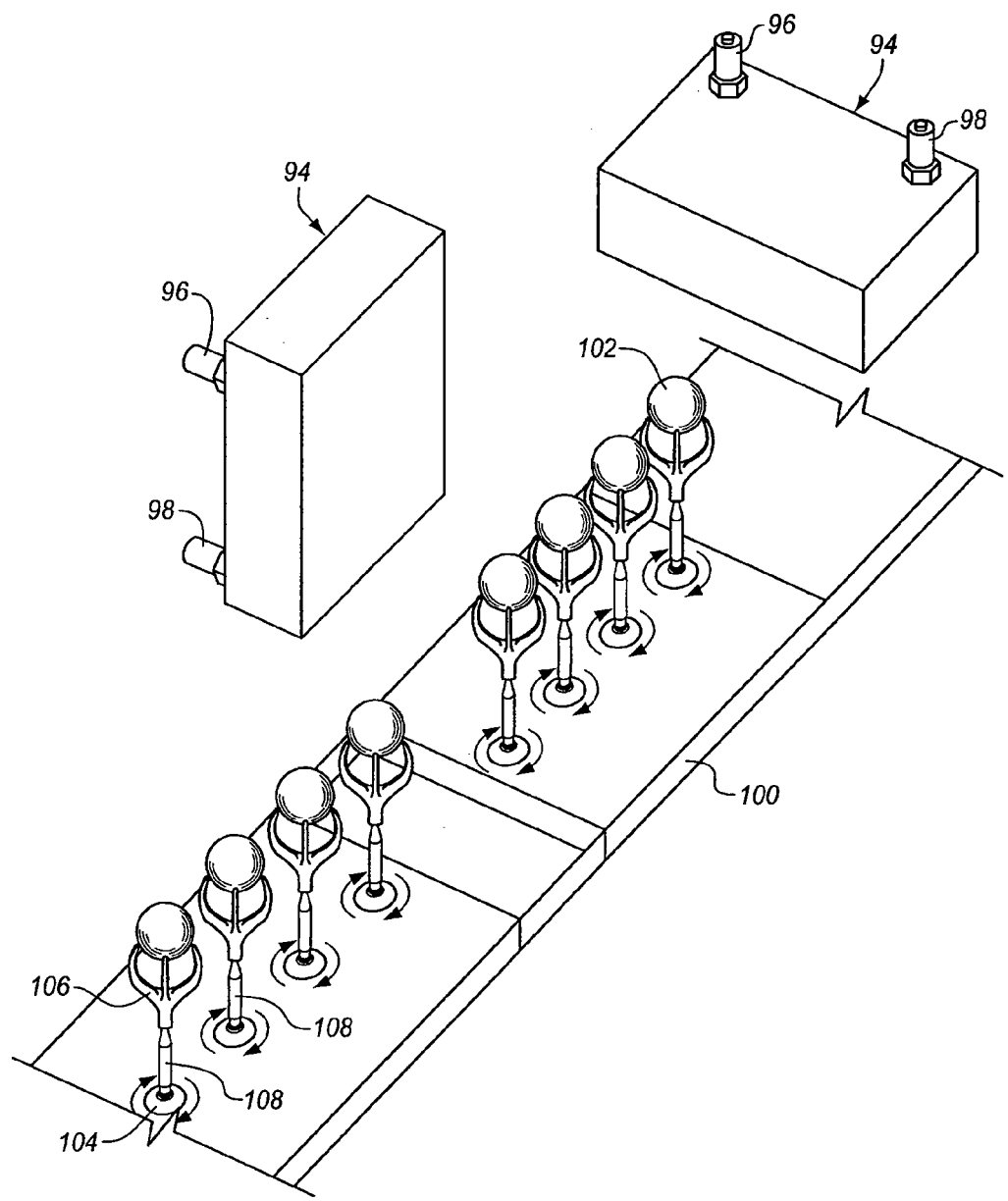
FIG. 6 is a perspective view of super high power UV-LED module assemblies positioned above and adjacent a conveyor carrying golf balls which are also rotating on the conveyor and which have a UV curable coating thereon.

FIG. 6 shows a high power UV-LED assembly 94 with a water inlet 96 and a water outlet 98 and staggered UV-LED arrays hidden from view on the underside of the assembly, mounted above a conveyor 100 carrying golf balls 102 which can be rotated by a spinning platform 104 on the conveyor 100. The spinning platform can have arcuate fingers 106 that extend upwardly from a rotatable (rotating) shaft 108. In this embodiment, a second high power UV-LED assembly 94 is positioned adjacent the conveyor 100 and perpendicular to the first assembly 94 so that UV light can be emitted and directed from two directions along one or more UV light paths to uniformly distribute UV light onto the gold balls 102 to more uniformly and evenly cure the UV curable printing (ink), coating or adhesive on the golf balls 102. The golf balls 102 can be uniformly, partially, or fully polymerized, set and cured when rotating, spinning or when stopped (stationary) on or off the conveyor 100. The golf balls 102 can be coated and protected with a clear transparent scratch-resistant UV curable coating and/or can be printed or labeled with a name and/or logo and/or design in a UV curable ink, either black ink or one or more colored inks.

Figure 7:
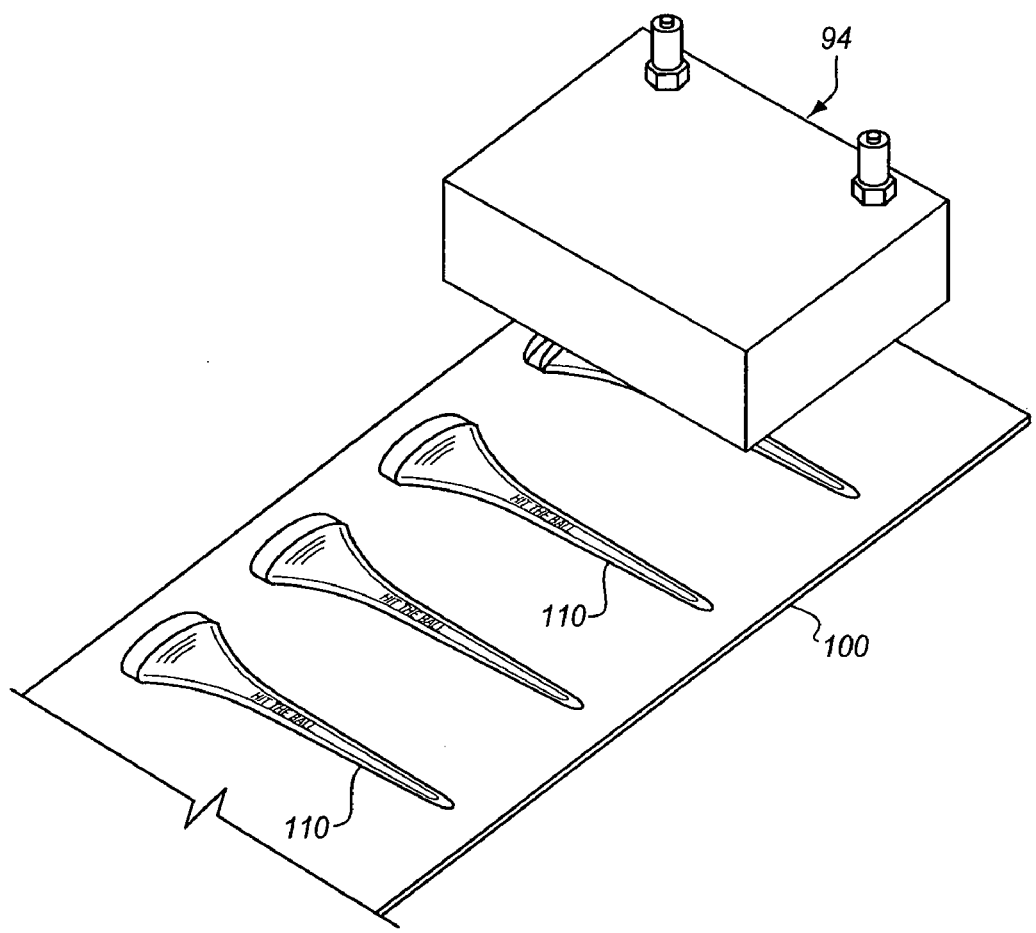
FIG. 7 is a perspective view of a super high power UV-LED module assembly positioned over a portion of a conveyor carrying golf tees which have been coated and/or printed with a UV curable material.

In FIG. 7, a high power UV-LED assembly 94 is positioned above a conveyor 100 carrying golf tees 110. In this embodiment, a UV curable coating or ink on the golf tees 110 can be uniformly partially or fully polymerized, set and cured as the conveyor 100 passes in a UV light path underneath the high power UV-LED assembly 94. If desired, another high power UV-LED assembly 94 also can be positioned on each side of the conveyor 100 for emitting, directing and applying UV light onto the golf tees 110 in another UV light path(s) from different directions.

Figure 8:
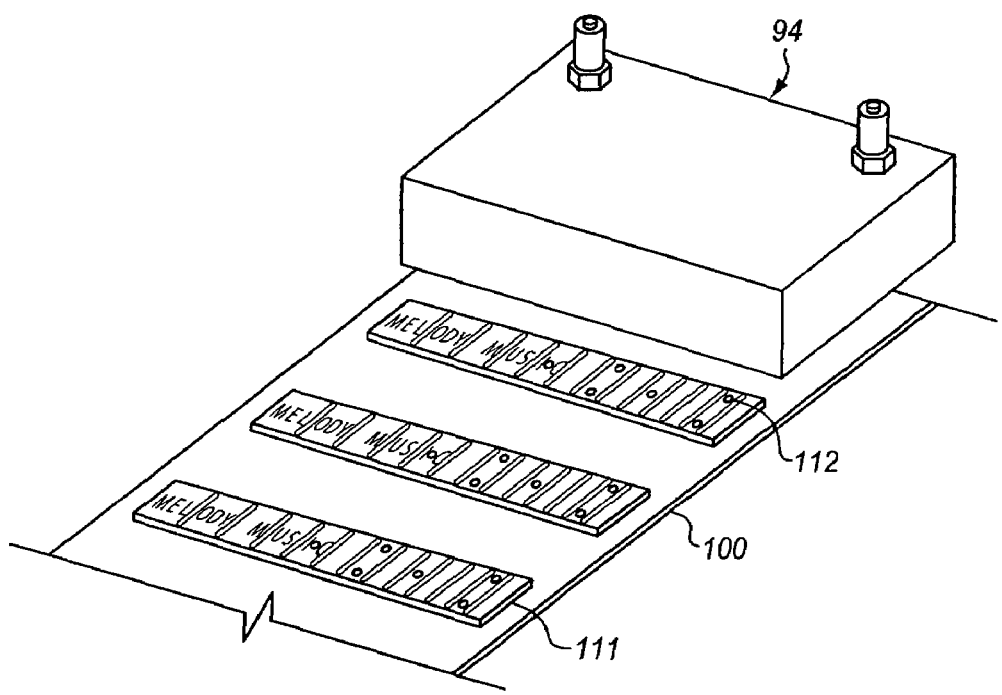
FIG. 8 is a perspective view similar to the view shown in FIG. 7 illustrating a super high power UV-LED module assembly positioned over a portion of a conveyor containing string instrument necks which have a UV curable coating thereon.

In FIG. 8, a high power UV-LED assembly 94, is positioned over the conveyor 100 carrying string instruments 111 with necks 112 or other portions having UV curable coating, adhesive, or printing material thereon. The string instrument necks 112 can be coated with a decorative UV curable coating or a clean transparent scratch-resistant UV curable coating. Various string instruments can be cured in this manner, such as: violins, violas, cellos, base violins, double base violins, guitars, mandolins, balalaikas, ukuleles, harps, etc. The high power UV-LED assembly 94 emits bursts or blasts of UV light in a light path to uniformly partially or fully polymerize, set and cure the UV curable coating on the string instruments.

Figure 9:
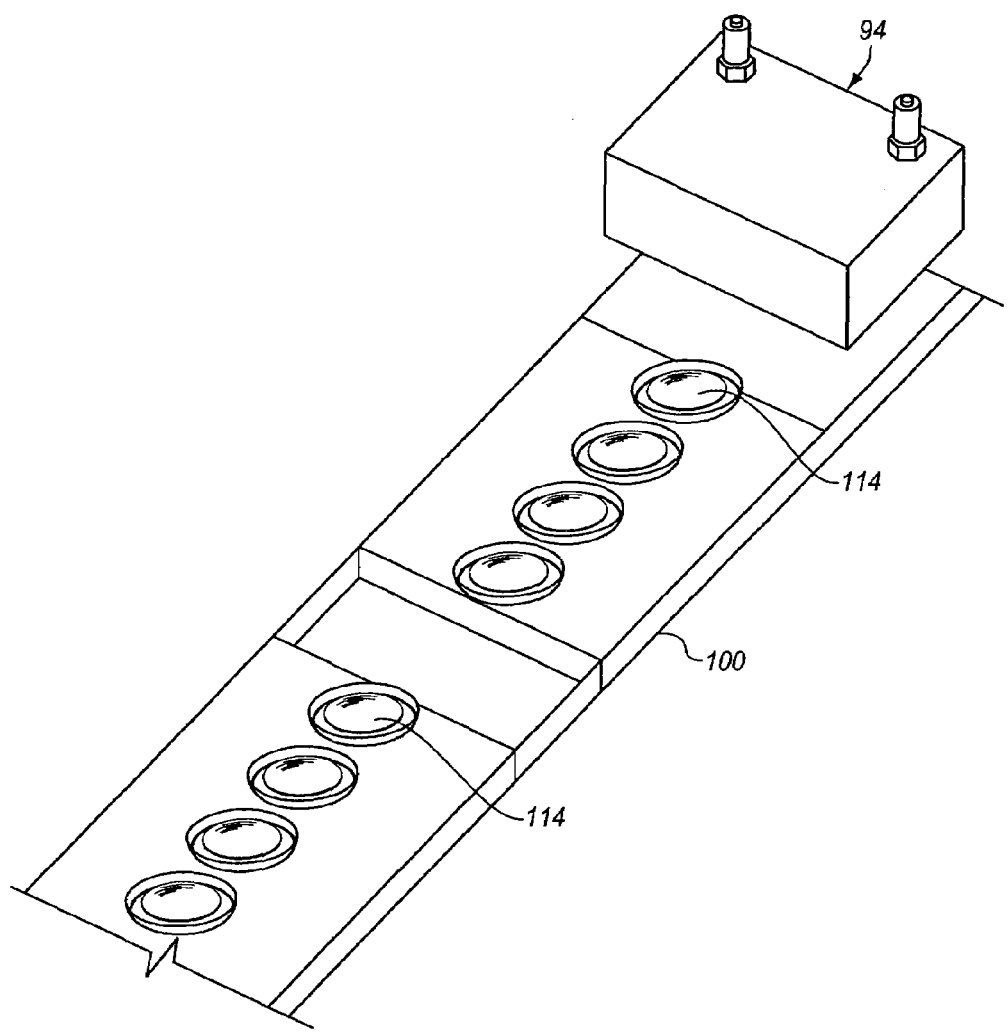
FIG. 9 is a perspective view showing a super high power UV-LED module assembly positioned above and adjacent a conveyor carrying coated eye glass lens.

FIG. 9, a high power UV-LED assembly 94 is positioned above a conveyor 100 carrying eye glass lenses 114 which have been coated with a scratch-resistant UV curable coating. The eye glass lenses 114 can be coated with a UV curable coating comprising a color tint (amber, grey, etc.) and/or clear transparent protective scratch-resistant coating and/or a UV-blocking coating. The eye glass lenses can be uniformly partially or fully polymerized, set and cured while rotating or stopped (stationary) on or off the conveyor 100.

Figure 10:
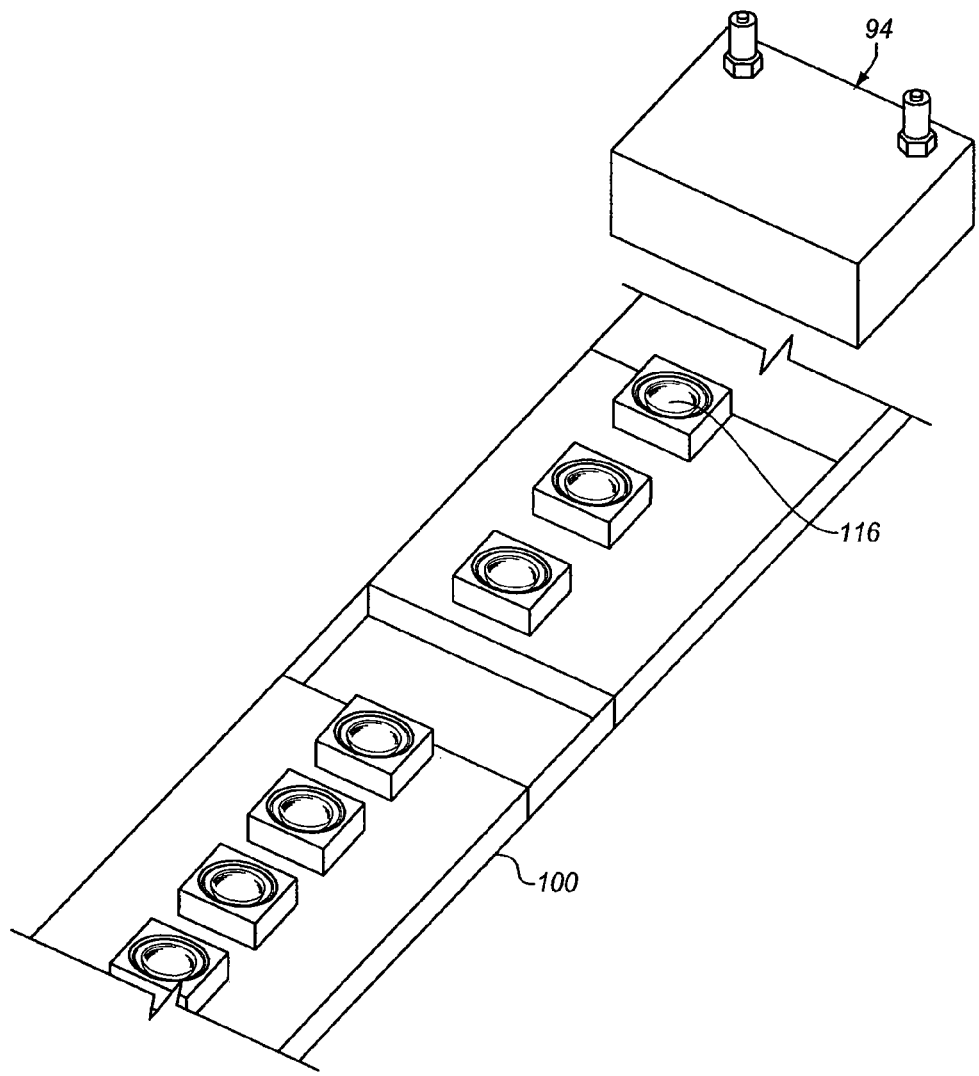
FIG. 10 is a perspective view of a super high power UV-LED module assembly positioned above and adjacent a conveyor carrying contact lens which are made of or have a coating made of a UV curable material.

FIG. 10 illustrates a high power UV-LED assembly 94 positioned above a conveyor 100 carrying UV curable soft hydroscopic contact lenses 116 containing a UV curable material or coating. The UV curing apparatus uniformly distributes high intensity UV light on the contact lenses to enhance uniform curing and polymerization of the UV curable material or coating on the contact lenses. It will be appreciated that, for the sake of illustration, only a single line of contact lenses 116 is shown for illustrating the UV curing method and apparatus of the present invention. However, in practice, a plurality of lines of contact lenses 116 are carried on the conveyor 100. The contact lenses 116 can be coated with a UV curable coating comprising a UV curable color tint and/or can be coated with a clear transparent protective scratch-resistant UV curable coating. The contact lenses 116 can be cured while spinning, rotating or stopped (stationary) on or off the conveyor 100.

Figure 11:
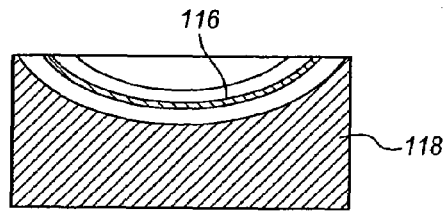
FIG. 11 is a cross-section of one form of carrier for the contact lens carried on the conveyor as shown in FIG. 10.

FIG. 11 is a sectional view of one type of contact lens holder 118 or suction cup which can be used on the conveyor 100 for holding and carrying the contact lenses 116.

Figure 12:
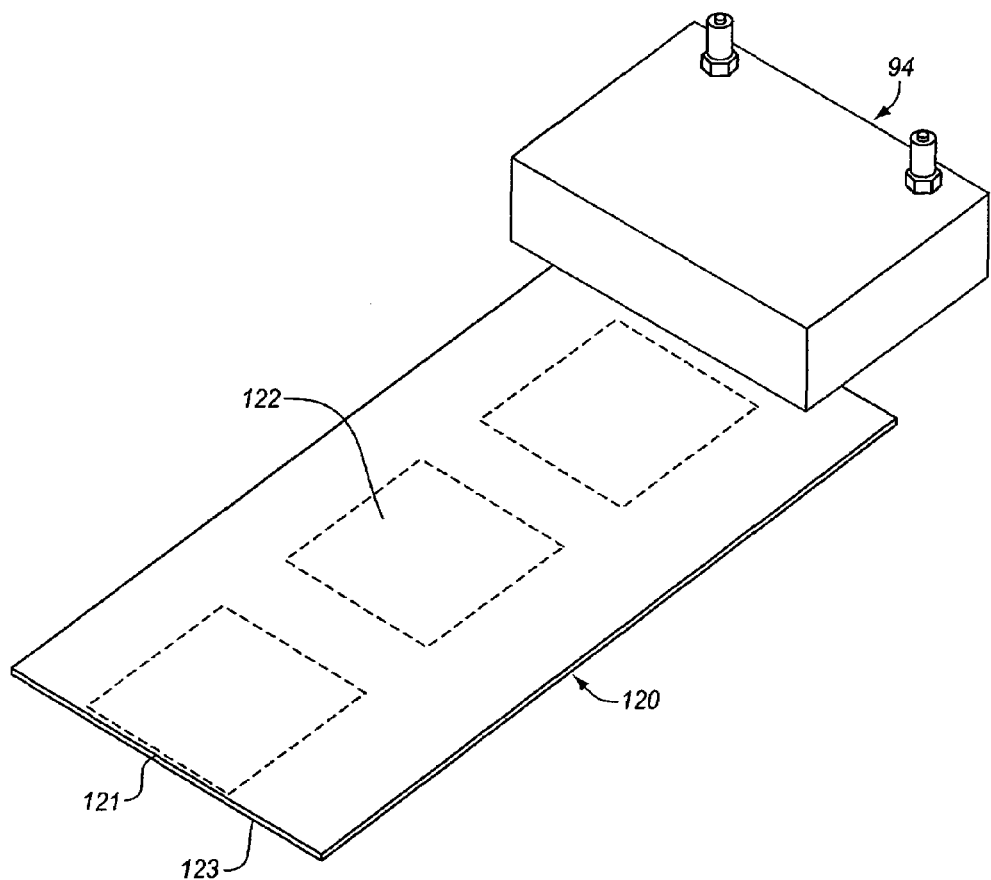
FIG. 12 is a perspective view of a super high power UV-LED module assembly positioned over a conveyor carrying labels which have a UV adhesive and a backing material beneath the label.

In the embodiment of FIG. 12, a sheet 120 or roll of peelable labels or peelable stamps 122 is positioned on a conveyor (not shown) below the high power UV-LED assembly 94. The sheet of peelable (removable, strippable or detachable) labels or stamps includes a silicon release liner 121 or other UV curable releasable adhesive sandwiched between an upper layer of labels 122 or stamps, and a lower backing layer 123. The peelable labels or peelable stamps can be readily peeled, removed, stripped or detached from the release liner 121 on the sheets 120.

Figure 13:
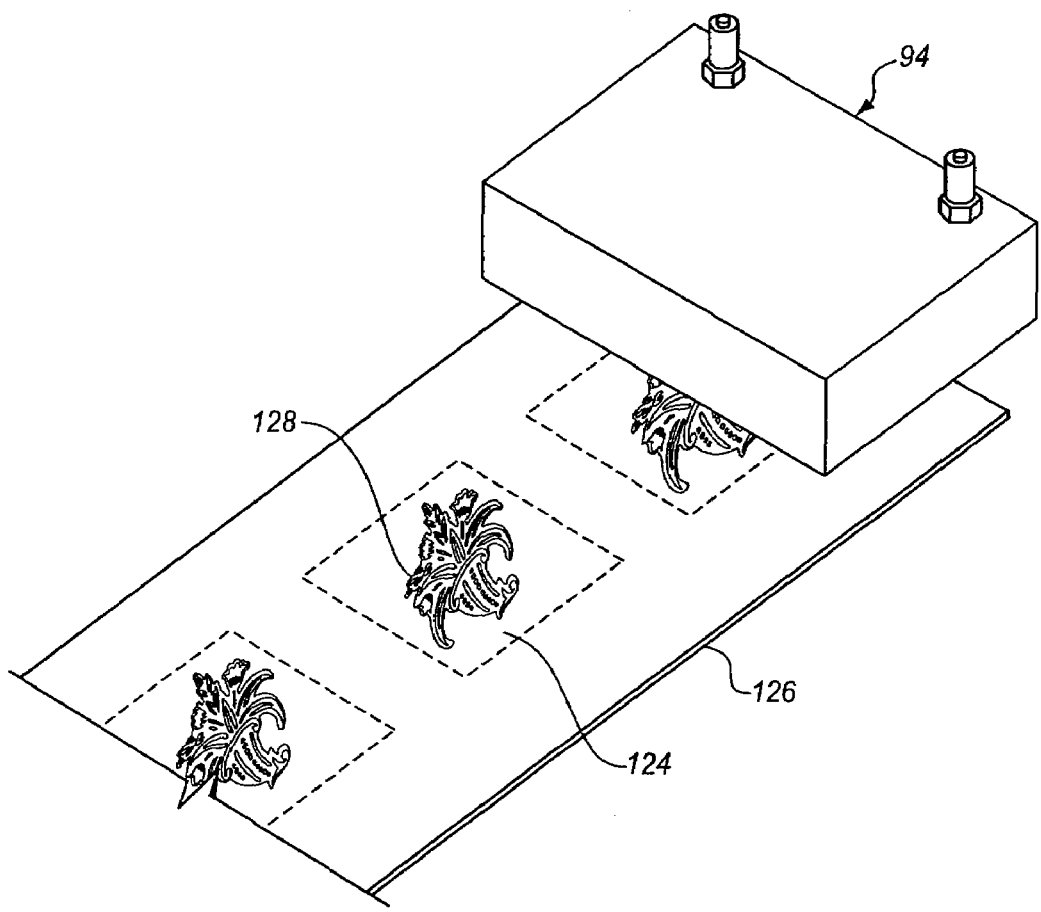
FIG. 13 is a view similar to the view shown in FIG. 11 and shows a super high power UV-LED module assembly positioned over a conveyor carrying labels for curing UV curable print (ink) on the label.

The embodiment of FIG. 13 is similar to the embodiment shown in FIG. 12 but with decorative peelable labels 124 or peelable stamps on a sheet 126 or roll. The peelable labels or stamps have UV curable print (ink) 128 (black or one or more colors) on the front or upper surface thereof which is cured by the high power UV-LED assembly 94.

The high power UV-LED assembly 94 can emit intermittent pulses or blasts of UV light along a UV light path to uniformly fully or partially polymerize, set, and cure the UV curable ink or UV curable adhesive on the peelable stamps 122 (FIG. 12) or peelable labels 124 (FIG. 13).

In the embodiment of FIG. 14, wooden, metal or composite doors 130 are positioned horizontally upon or hung vertically from a conveyor 100. The doors are coated with a UV curable coating such as a clear transparent scratch-resistant UV curable coating or a colored UV curable coating providing a UV curable paint or UV curable stain. The high power UV-LED assembly 94 is positioned to emit and uniformly distribute and apply UV light along one or more UV light paths to each surface of the doors 130 to uniformly fully or partially cure, set and polymerize the UV curable coating on the doors 130.

In the embodiment of FIG. 15, wooden, metal, stone, or composite counter tops 132 are positioned on a conveyor with their top surfaces facing upwardly and below a high power UV-LED assembly 94. The top surfaces of the countertops 132 are coated with a UV curable coating such as a clear transparent scratch-resistant UV curable coating or a colored UV curable coating. The high power UV-LED assembly 94 can emit intermittent pulses or blasts of UV light along one or more UV light paths to uniformly fully or partially cure, set, and polymerize the UV curable coating on the countertops 132.

Other products with a UV curable coating, ink or adhesive thereon can cured on a conveyor by using one or more super high power UV-LED modules in a manner generally similar to that described above.

In all the embodiments shown in the drawings and/or described in the specification, it is be understood that one, two, or three or more super high power UV curing modules providing a UV curing apparatus with high intensity UV-LED chips that emit high intensity UV light can be positioned over and on either or both sides of the path of travel of the UV curable products, articles, inks, coatings, adhesives, or other objects in a manner to more uniformly distribute the UV light along one or more UV light paths on the UV curable products, articles, inks, coatings, adhesives, or other objects to increase uniform curing and polymerization of the UV curable products, articles, inks, coatings, adhesives, or other objects. The super high power UV curing modules providing a UV curing apparatus with high intensity UV-LED chips that emit high intensity UV light can also extend and be positioned entirely transversely across the conveyor and/or include staggered arrays of high intensity UV-LED chips so there are no light gaps emitted on the UV curable products passing below the super high power UV-LED modules. If desired, the super high power UV curing modules can have more or less than 21 high intensity UV-LED chips that emit high intensity UV light.

Although embodiments of the invention have been shown and described, it will be understood that various modifications and substitutions, as well as rearrangements of components, parts, equipment, apparatus, process (method) steps, and uses thereof, can be made by those skilled in the art without departing from the teachings of the invention. Accordingly, the scope of the invention is only to be limited as necessitated by the accompanying claims.

What is claimed is:

1. A method for curing an ultraviolet (UV) curable coating or printing on an elongated member, such as a fiber, wire, tubing, tube, hose or pipe, comprising the steps of:
    positioning one or more high power, water cooled ultraviolet light-emitting diode (UV-LED) modules having high intensity UV-LED chips in proximity to an elongated member;
    positioning a curved reflector opposite the UV-LED module so that the elongated member is positioned between the UV-LED module and the curved reflector;
    emitting high intensity UV light from the high intensity UV-LED chips in the UV-LED module onto the elongated member; and
    substantially preventing the high intensity UV light from contacting and degrading the UV-LED chips by substantially preventing the UV-LED chips from being opposite and in the path of the high intensity UV light.

2. The method of claim 1 including positioning a transparent tube around the elongated member.

3. The method of claim 2 including substantially filling the transparent tube with an inert gas.

4. The method of claim 1 including:
    positioning four UV-LED modules about the elongate member in a staggered array with each UV-LED module rotated 90 degrees from an adjacent UV-LED module; and
    positioning a curved reflector opposite each UV-LED module.

5. An apparatus for curing an ultraviolet (UV) curable coating or printing on an elongated member, such as a fiber, wire, tubing, tube, hose or pipe, comprising:
    at least one high power, water cooled ultraviolet light-emitting diode (UV-LED) module mounted on one side of the elongate member; and
    a curved reflector positioned on the other side of the elongate member opposite the UV-LED module.

6. The apparatus of claim 5 further comprising a transparent tube positioned around the elongated member.

7. The apparatus of claim 5 including:
    four UV-LED modules positioned about the elongated member in a staggered array with each UV-LED module rotated 90 degrees from an adjacent UV-LED module; and
    a curved reflector positioned opposite each UV-LED module.

* * * * *